United States Patent [19]

Satoya et al.

[11] Patent Number: 5,307,783
[45] Date of Patent: May 3, 1994

[54] BOOST PRESSURE CONTROL SYSTEM FOR AN ENGINE

[75] Inventors: Koichi Satoya; Hidemi Ohnaka, both of Susono; Michio Furuhashi, Mishima; Yasuhiro Ooi, Susono, all of Japan

[73] Assignee: Toyota Jidosha Kabushiki Kaisha, Toyota, Japan

[21] Appl. No.: 18,205

[22] Filed: Feb. 16, 1993

[30] Foreign Application Priority Data

Mar. 10, 1992 [JP] Japan ................................. 4-051349

[51] Int. Cl.⁵ ............................................. F02B 33/00
[52] U.S. Cl. ................................. 123/559.3; 123/564; 192/0.084; 192/0.096
[58] Field of Search ............... 60/602; 123/559.3, 564; 192/0.084, 0.096

[56] References Cited

U.S. PATENT DOCUMENTS 4,669,441 6/1987 Okimoto ........................... 123/559.3

FOREIGN PATENT DOCUMENTS 101622 5/1986 Japan.
276220 12/1987 Japan.

*Primary Examiner*—Michael Koczo
*Attorney, Agent, or Firm*—Cushman, Darby & Cushman

[57] ABSTRACT

A boost pressure control system for a vehicle engine equipped with a supercharger and a torque converter having a lock-up clutch, in which the boost pressure is controlled by adjusting the degree of the opening of an air bypass valve and the ON/OFF position of the supercharger in such manner that the different control characteristics of the boost pressure are selected in accordance with whether the lock-up clutch of the torque converter is turned ON or OFF, i.e., when the lock-up clutch is turned ON, the supercharger is started at a lower engine load, and the degree of the opening of the air bypass valve is set smaller, thereby enabling the lock-up operation of the torque converter under running conditions in which a higher driving torque is required and, thereby widening the operating range of the lock-up operation of the torque converter and improving the fuel economy of the vehicle.

4 Claims, 6 Drawing Sheets

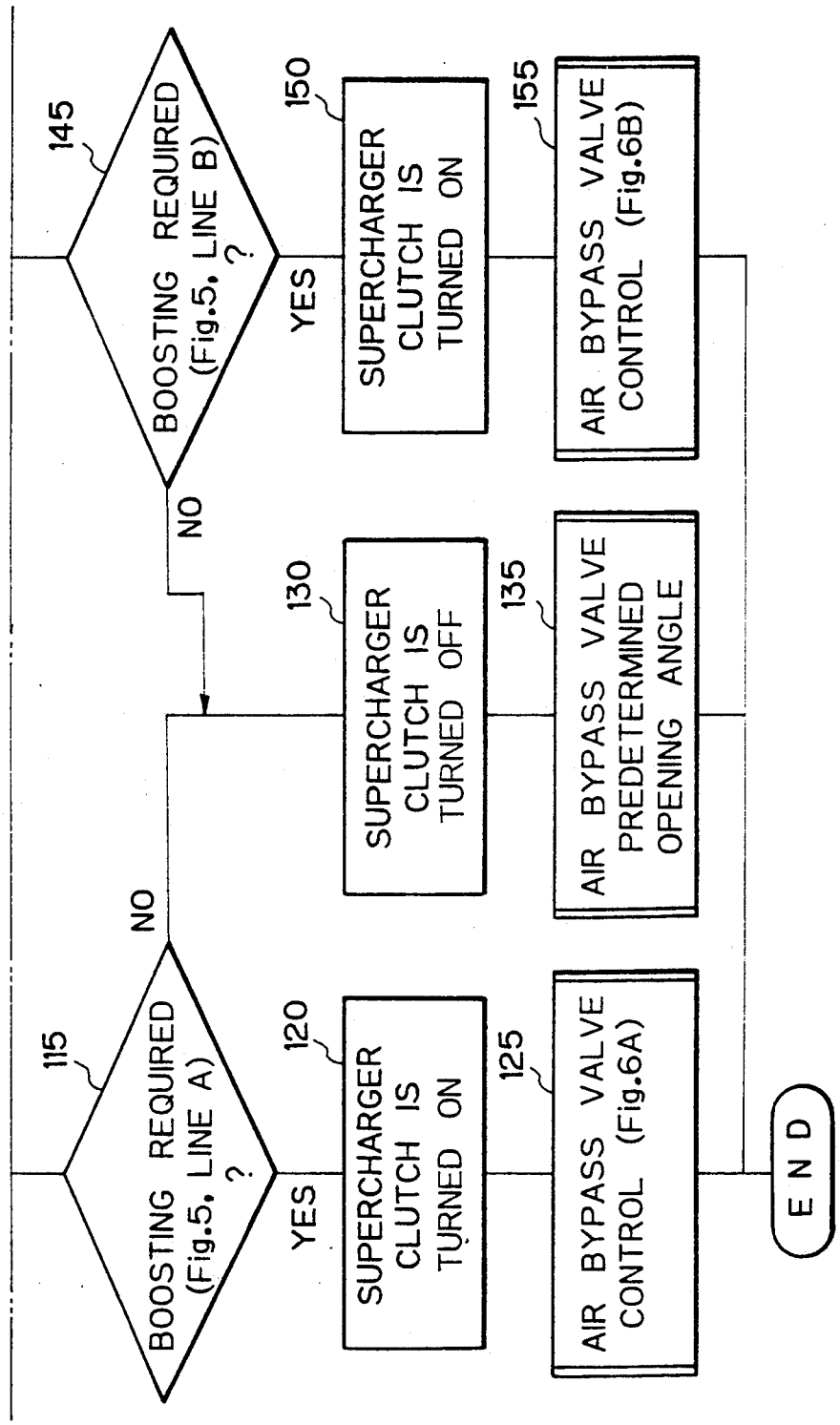

BOOST PRESSURE CONTROL SYSTEM FOR AN ENGINE

BACKGROUND OF THE INVENTION

Field of the Invention

The present invention relates to a boost pressure control system for a vehicle engine equipped with a torque converter having a lock-up clutch.

Description of the Related Art

A torque converter having a lock-up clutch is commonly used for a vehicle engine.

The lock-up clutch is used for mechanically coupling the input shaft and output shaft of the torque converter when enhancement of the driving torque is not required, thereby avoiding a power loss and an increasing in the fuel consumption as a result of a "slippage loss" of the torque converter (i.e., transmission loss caused by a difference between the speeds of the input shaft and the output shaft of the torque converter).

Usually, the lock-up operation of the torque converter is carried out (i.e., the lock-up clutch is turned "ON") under predetermined running conditions defined by engine load parameters such as the degree of throttle opening of the engine and the running speed of the vehicle. From the view point of fuel economy, it is preferable to set the region of the lock-up operation of the torque converter as wide as possible.

Also, in the vehicle engine equipped with a supercharger driven from an engine output shaft, it is known to provide a power transmission clutch between the engine output shaft and the supercharger, and an air bypass passage bypassing the supercharger for controlling the boost pressure of the engine.

In such an engine, the boost pressure is controlled by connecting or disconnecting (i.e., ON or OFF) the power transmission clutch ( hereinafter, the power transmission clutch is referred to as the supercharger clutch ) and by adjusting the degree of opening of an air bypass valve disposed in the air bypass passage (see Japanese Unexamined Patent Publication No. 62-276220)

Namely, when the engine is operated under lower load conditions in which supercharging is not required, the supercharger clutch is turned OFF (i.e., disconnected) to stop the operation of the supercharger, thereby reducing power loss incurred by driving the supercharger, and improving the fuel consumption of the engine. When the engine is operated under higher load conditions, in which supercharging is required, the supercharger clutch is turned ON to start the operation of the supercharger and, also the degree of opening of the air bypass valve is decreased as the engine load increases, so that the boost pressure becomes higher in the higher engine load region thereby increasing the engine boost pressure.

Japanese Unexamined Patent Publication No. 61-101622 discloses a boost pressure control system for an engine equipped with a supercharger that is used in combination with a torque converter having a lock-up clutch.

Since the lock-up clutch is used to terminate the torque enhancing effect of the torque converter, the driving torque of the vehicle decreases when the lock-up clutch is turned ON. On the other hand, when the supercharger is operated, the engine output torque increases due to an increase in the inlet air pressure.

Therefore, if the lock-up clutch and the supercharger begin operating successively over a short period of time, a sudden decrease in the engine speed owing to the operation of the lock-up clutch and a sudden increase in engine speed owing to the operation of the supercharger occur over a short period of time, which deteriorates the driveability of the vehicle significantly.

The boost pressure control system disclosed in Japanese Unexamined Patent Publication No. 61-101622 prevents this deterioration in the driveability by initiating the ON / OFF operation of the lock-up clutch and start / stop of the supercharger at the time when the ON / OFF operation of the lock-up clutch is required by a shift down operation of an automatic transmission and if the engine load condition enters the operating region of the supercharger due to said shift down operation of the automatic transmission.

In prior arts, when an engine equipped with a supercharger is used in combination with a torque converter having a lock-up clutch, the load conditions thereby initiating an ON / OFF operation of the lock-up clutch and the load conditions thereby starting/stopping the supercharger are determined independently from each other. In other words, the supercharger in the prior arts starts or stops at the same load conditions regardless of whether the lock-up clutch is turned ON or OFF. Though an ON / OFF operation of the lock-up clutch and start / stop operations of the supercharger are initiated simultaneously in the boost pressure control system of Japanese Unexamined Patent Publication No. 61-101622, the load conditions themselves initiating such operations are determined independently from each other.

However, even during the operating conditions in which the engine load is too low for the lock-up operation of the torque converter without operating the supercharger, the lock-up operation of the torque converter may become possible if the engine torque is increased by starting the operation of the supercharger.

Further, usually slippage loss incurred by a non-lock-up operation of the torque converter (i.e., an operation in which the lock-up clutch is turned OFF) increases the fuel consumption of the engine by an amount larger than the power loss incurred by operating the supercharger.

In the prior art, there are cases in which the torque converter is operated under non-lock-up conditions, even though the lock-up operation of the torque converter can be carried out if the supercharger is started. Accordingly, in such cases, fuel economy is impaired compared to the case in which the lock-up operation of the torque converter is carried out by starting the supercharger.

To prevent this, the load conditions of the start/stop operation of the supercharger can be set so that the supercharger is started at a lower engine load thereby enabling the lock-up operation of the torque converter.

However, if the operation range of the supercharger is extended to a lower engine load range irrespective of other operating conditions, the fuel economy may be impaired because of the power loss resulting from unnecessary operation of the supercharger. Also, if the load conditions starting or stopping the supercharger are determined regardless of the ON/OFF state of the lock-up clutch, an ON/OFF operation of the lock-up clutch is initiated under operating conditions in which the difference in driving torque caused by an ON/OFF operation of the lock-up clutch is very large. If the ON/OFF operation of the lock-up clutch is initiated under such conditions, a large torque shock occurs and driveability deteriorates.

The above problems are depicted by FIG. 2A, which shows an example of the boost pressure control in the prior arts.

In FIG. 2A, the horizontal axis represents the degree of opening of the throttle valve of the engine (i.e., the load of the engine), and the vertical axis represents the driving torque of the vehicle (i.e., the torque at the output shaft of the torque converter). Curves I and II in the figure represent the driving torque of the vehicle at a constant vehicle speed, where curve shows the driving torque during the lock-up operation of the torque converter, and curve II shows the same during the non-lock-up operation of the torque converter.

As shown in FIG. 2A, in the prior arts, the boost pressure control is carried out regardless of whether the torque converter is in the lock-up position. Namely, the supercharger is always started when the engine load becomes larger than a predetermined first value (i.e., TH1 in FIG. 2A), the air bypass valve is then gradually closed as the engine load increases. When the engine load increases to a predetermined second value (i.e., TH2 in FIG. 2A), the air bypass valve is fully closed to achieve maximum boosting of the engine.

Curve I in FIG. 2A, which shows the condition of the lock-up operation of the torque converter, indicates the supercharger is started at point B and the maximum boosting of the engine is achieved at point C. The driving torque obtained in the range between points B and C is relatively low since the torque converter is operated in the lock-up position without supercharging. Accordingly. if a larger driving torque is required, the lock-up clutch must be turned OFF to increase the driving torque since operation of the supercharger is not initiated in this operating range, which increases the fuel consumption of the engine because of slippage loss during the non-lock-up operation of the torque converter.

On the other hand, assuming that the torque converter is operated in the lock-up position at point C on curve I (the maximum boosting condition of the engine), if a larger driving torque is required, the lock-up clutch must be turned OFF during high engine output torque conditions. As seen from curves I and II, if the lock-up clutch is turned OFF at point C, the operating point shifts suddenly from point C on curve I to point E on curve II. Since the difference in driving torque between points C and E is very large, the driver of the vehicle must depress the accelerator pedal by large amount so as to adjust the engine torque such that the operating point shifts from point C on curve I to point C' on curve II and thereby avoid torque shock resulting from a sudden increase in driving torque, which deteriorates driveability significantly.

SUMMARY OF THE INVENTION

An object of the present invention is to solve the aforementioned problems by providing a boost pressure control system that can improve fuel consumption by extending the range of the lock-up operation of the torque converter and also reduce the torque shock during the ON/OFF operation of the lock-up clutch, thereby preventing a deterioration of the driveability of the vehicle.

According to the present invention, there is provided a boost pressure control system for a vehicle engine equipped with a torque converter including a lock-up clutch; said boost pressure control system comprising an intake pressure boost means for boosting the intake pressure of the engine, and a boost pressure control means for setting the boost pressure of the engine by controlling said intake pressure boost means such that said boost pressure is determined as a function of engine load and said function of the engine load is selected by said boost pressure control means from among a plurality of predetermined functions in accordance with whether said lock-up clutch of the torque converter is connected or disconnected.

The present invention will be better understood from the description of a preferred embodiment thereof as set forth below, with reference to the accompanying drawings.

BRIEF DESCRIPTION OF THE DRAWINGS

In the drawings:

FIG. 3A and FIG. 3B, collectively referred to as FIG. 3, are an example of a flow chart of a routine for a boost pressure control according to the present invention;

DESCRIPTION OF A PREFERRED EMBODIMENT

Figure 1:
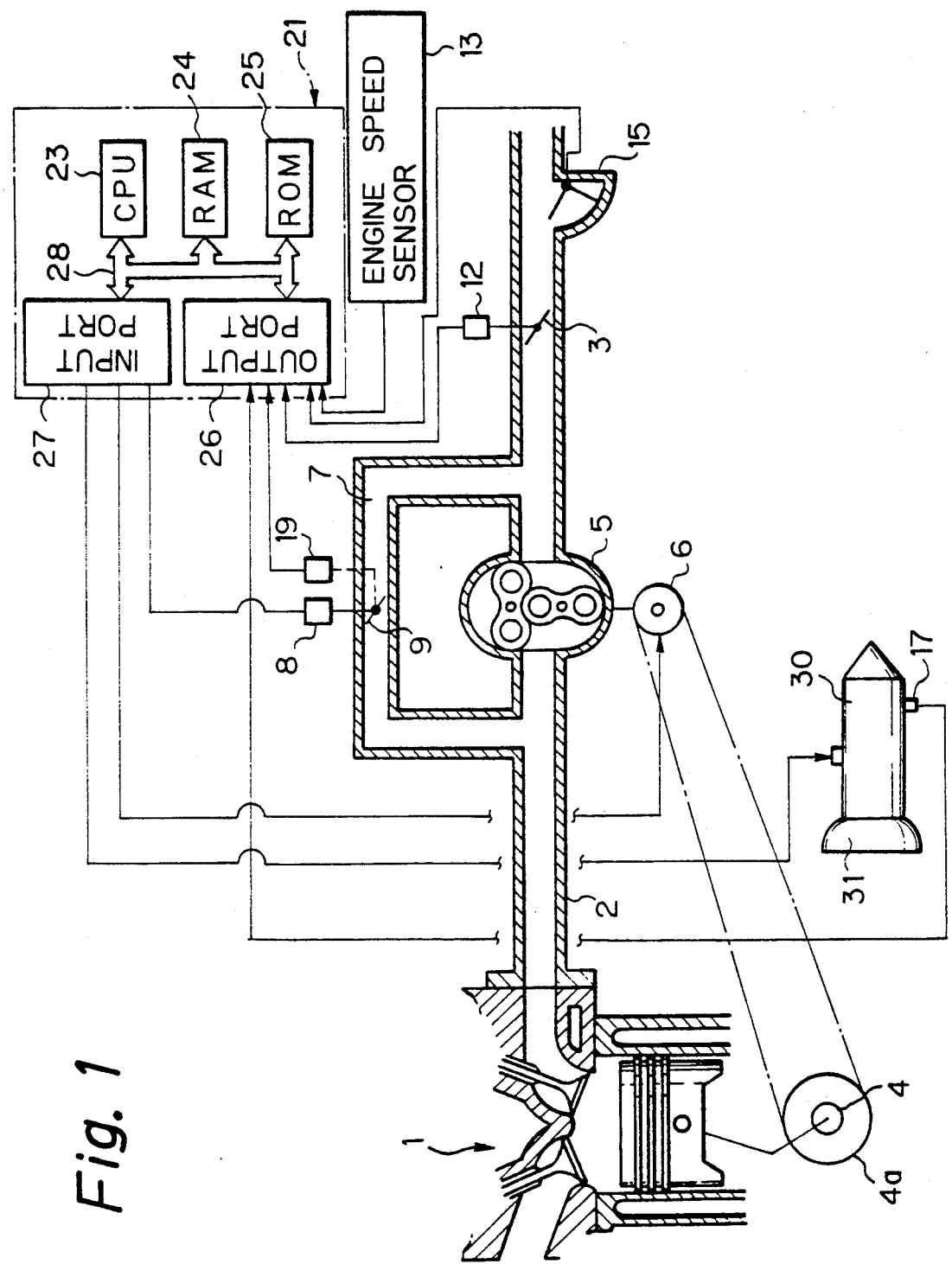
FIG. 1 is a schematic view of an embodiment of an engine fitted with a boost pressure control system of the present invention.

FIG. 1 illustrates an embodiment of the boost pressure control system according to the present invention.

Referring to FIG. 1, reference numeral 1 represents an engine of a vehicle, 2 is an inlet air passage, and 3 represents a throttle valve that controls an inlet air flow through the inlet air passage in response to the operation of an accelerator pedal (not shown) by a vehicle driver. Reference numeral 5 represents a supercharger disposed on the inlet air passage 2 downstream of the throttle valve 3. In this embodiment, a Roots type blower is used as the supercharger 5. The supercharger 5 is driven by a crank pulley 4a attached to a crankshaft 4 of the engine 1, via a drive belt and magnetic clutch 6. The supercharger 5 can be started or stopped during the operation of the engine by connecting (ON) or disconnecting (OFF) the magnetic clutch 6.

Numeral 7 denotes an air bypass passage connecting portions of the inlet air passage 2 downstream of the throttle valve 3 (upstream of the supercharger 5) and downstream of the supercharger 5. An air bypass valve 9 is disposed in the air bypass passage 7. The air bypass valve 9 is driven by an actuator 8 such as a stepping motor, and can be set at any position between fully closed and fully open so as to control the air flow through the air bypass passage 7.

When the degree of the opening of the air bypass valve 9 is increased, the air flow returning from the outlet of the supercharger 5 to the inlet thereof increases, and thereby the boost pressure of the engine decreases due to a reduction in the compression ratio of the supercharger 5. On the contrary, when the degree of the opening of the air bypass valve 9 is decreased, the boost pressure increases due to an increase in the compression ratio of the supercharger 5. Accordingly, the boost pressure can be controlled by adjusting the degree of the opening of the air bypass valve 9.

Numerals 12 and 19 denote opening angle sensors that detect the degree of the opening of the throttle valve and the air bypass valve, respectively. Numeral 13 denotes an engine speed sensor detecting the rotating speed of the engine crankshaft 4, and 15 denotes an air flow meter detecting an inlet air flow of the engine.

In this embodiment, an automatic transmission 30 that is equipped with a torque converter 31 having a lock-up clutch is connected to the output shaft of the engine 1. The gear shift operation of the automatic transmission and the ON/OFF operation of the lock-up clutch is initiated by control signals from an engine control unit 21, which is explained later. Also, a running speed sensor 17 that detects a running speed of the vehicle is provided on the output shaft of the transmission 30.

Reference numeral 21 represents an engine control unit (hereinafter called ECU) 21 for performing fundamental engine controls, such as ignition timing control and fuel injection control.

In this embodiment, the ECU 21 is composed of a known type of digital computer including a CPU 23, a RAM 24, a ROM 25 and an input port 26, and an output port 27 that are interconnected by a dual direction bus 28.

The ECU 21 in this embodiment further performs the boost pressure control of the present invention. To perform these controls, the signals from the throttle opening sensor 12, the engine speed sensor 13, the running speed sensor 17, and the air bypass valve opening angle sensor 19 are input to the input port 26 of the ECU 21. The output port 27 is connected to the actuator 8 of the air bypass valve 9, the magnetic clutch 6 of the supercharger (hereinafter called supercharger clutch) and the automatic transmission 30 via respective drive circuits to control the degree of the opening of the air bypass valve 9, the ON/OFF operation of the supercharger clutch 6 and the lock-up operation of the torque converter 31.

The boost pressure control carried out by the ECU 21 is then explained with reference to FIG. 2B.

Figure 2A:
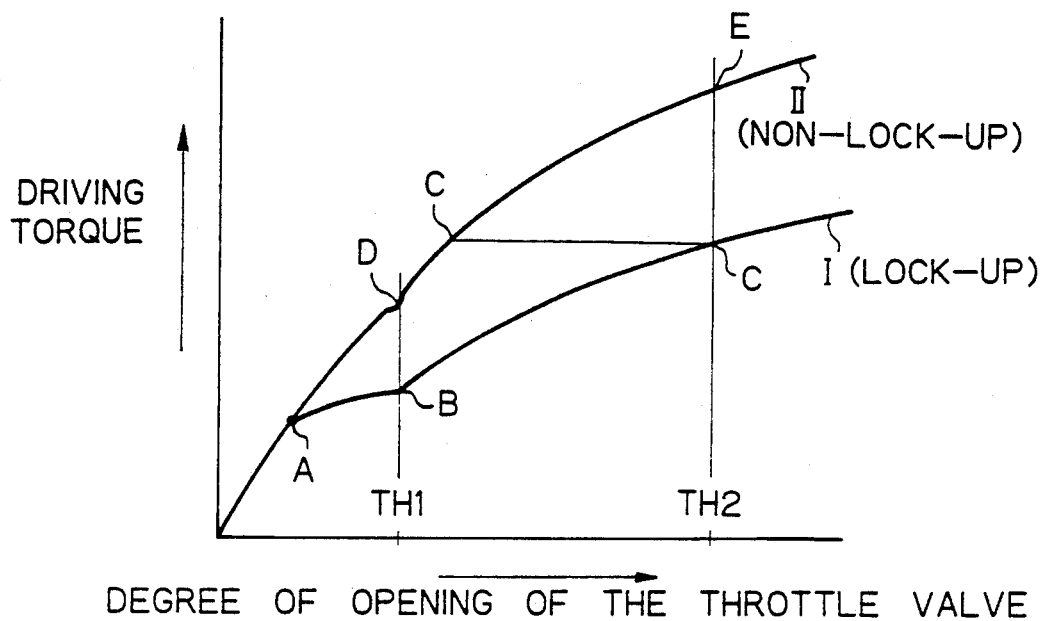
FIG. 2A and FIG. 2B illustrate the relationships between the driving torque of a vehicle and the degree of throttle opening of an engine under boost pressure control in the prior arts (FIG. 2A) and in the present invention (FIG. 2B)
Figure 2B:
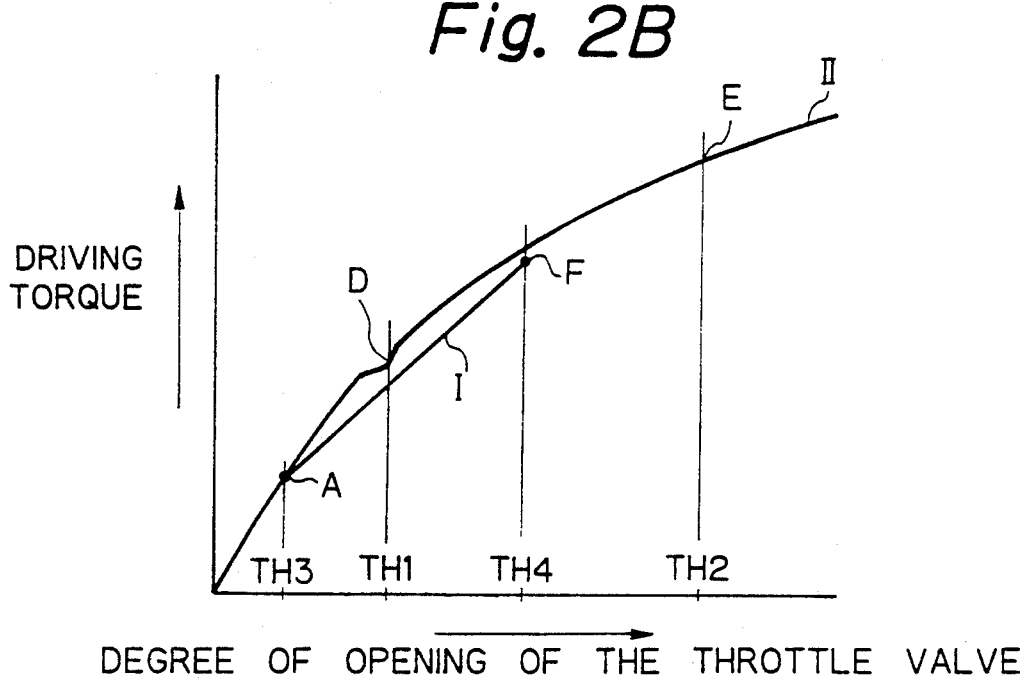

FIG. 2B is a drawing similar to FIG. 2A, but shows the relationship between the driving torque of the vehicle and the engine operating load under boost pressure control according to the present invention. In FIG. 2B, the horizontal axis represents the degree of throttle opening of the engine (i.e., the load of the engine), and the vertical axis represents the driving torque of the vehicle (i.e., the torque at the output shaft of the torque converter 31). Curves I and II represent the driving torque of the vehicle at a constant vehicle speed, where curve shows the driving torque during the lock-up operation of the torque converter (i.e., when the lock-up clutch is being ON), and curve II shows the same during the non-lock-up operation of the torque converter (i.e., the lock-up clutch is OFF).

As shown in FIG. 2B, the operations of the supercharger 5 and the air bypass valve in this embodiment are controlled based on different functions of the engine load in accordance with the ON/OFF conditions of the lock-up clutch.

In this embodiment, when the torque converter is operated in the lock-up condition (curve ), the ECU 21 initiates the operation of the supercharger 5 at a lower engine load than when the lock-up operation of the torque converter is being cancelled (curve II, i.e., in the non-lock-up operation of the torque converter). Further, when the lock-up operation of the torque converter is carried out, the boost pressure is controlled in such manner that in a lower engine load operating range, the boost pressure becomes higher than when the lock-up operation of the torque converter is being cancelled, thereby increasing the engine output torque.

Namely, as shown in FIG. 2B, when the lock-up operation of the torque converter is being cancelled (curve II), the operation of the supercharger 5 is started at the engine load TH1 (point D) and the maximum boosting condition of the engine is achieved at the engine load TH2 (point E) in the same manner as the prior art. On the other hand, when the lock-up operation of the torque converter is carried out (curve I), the operation of the supercharger 5 is started at the engine load TH3 (point A) which is lower than TH1, and the maximum boosting condition of the engine is achieved at the engine load TH4 (point D), which is also lower than TH2.

Therefore, in the operating range between points A and F on curve 1, though the torque converter is operated in the lock-up condition, the driving torque is increased by boosting same to nearly the same level as that of the non-lock-up operation of the torque converter. Accordingly, the lock-up operation of the torque converter becomes possible even in the engine operating range between the throttle opening angles TH3 and TH4 in which the lock-up operation of the torque converter must be cancelled in the prior art. Thus, fuel consumption is improved because of the extended lock-up operation range of the torque converter.

Further, since the driving torque in the lock-up operation of the torque converter (curve I) increases and approachs the driving torque in the non-lock-up operation of the torque converter, the torque shock caused by disconnecting the lock-up clutch at a relatively large throttle angle (for example, at point F in FIG. 2B) is reduced significantly. Accordingly, only a small depression of the accelerator pedal is required from the driver to avoid torque shock, thereby ensuring that a deterioration in driveability does not occur.

Figure 3A:
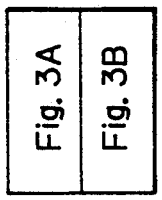
Figure 3A:
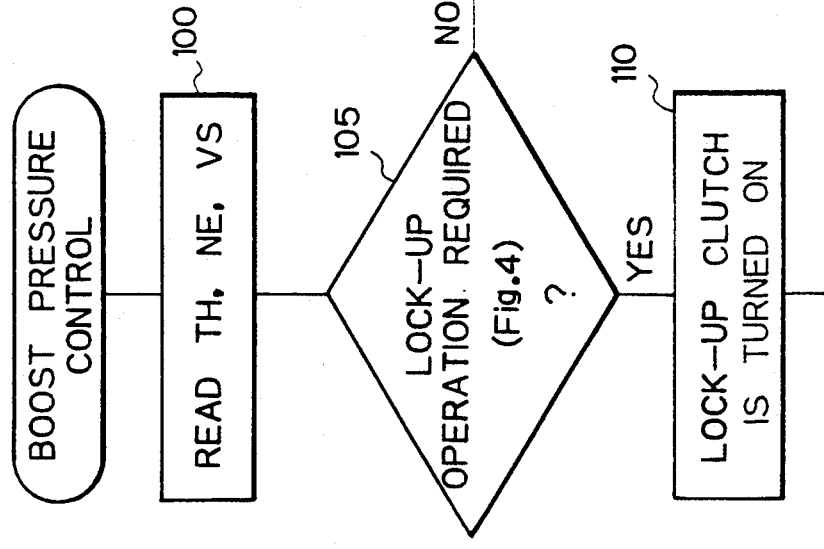

FIG. 3 illustrates a routine for achieving the above-mentioned boost pressure control of the present embodiment, which is processed by the ECU 21 by sequential interruptions at predetermined intervals (for example, 16 msec.).

Referring to FIG. 3, when the routine starts, parameters such as the degree of the opening of the throttle valve TH, the engine speed NE, and the running speed of the vehicle VS are read from the RAM 24. The parameters TH, NE, VS are input from respective sensors 12, 13, 17 at predetermined intervals or at every predetermined rotation angle of the crankshaft, and stored into the RAM 24. Accordingly, the values of these parameters stored in the RAM 24 are always updated.

Figure 4:
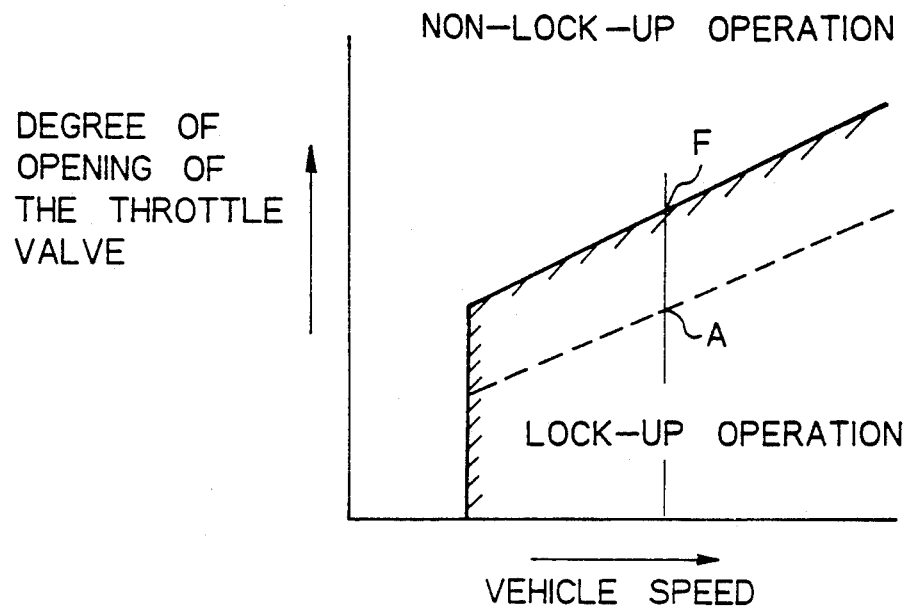
FIG. 4 illustrates the condition in which the lock-up operation of the torque converter is carried out.

Then, in step 105, it is determined from the running condition of the vehicle whether or not the lock-up operation of the torque converter 31 is required. The running condition requiring the lock-up operation of the torque converter is defined by the parameters such as the degree of the opening of the throttle valve TH and the running speed of the vehicle VS. FIG. 4 shows an example of the running conditions in which the lock-up operation of the torque converter is required.

As shown in FIG. 4, when the running speed of the vehicle is higher than a predetermined value, the degree of the opening of the throttle valve, at which an ON/OFF operation of the lock-up clutch is initiated, is set higher as the running speed of the vehicle increases. The dotted line in FIG. 4 indicates the boundary of the lock-up operation region of the torque converter in the prior art. Also, points A and F in FIG. 4 indicate the degrees of the opening of the throttle valve corresponding to points A and F in FIGS. 2A and 2B. As explained later, the lock-up operation region of the torque converter becomes wider in this embodiment by extending the boost operation region of the engine to a lower engine load.

In this embodiment, the running conditions defined by FIG. 4 are previously stored in the ROM 25 as a numerical table of TH and VS, and whether or not the lock-up operation of the torque converter is required is determined in accordance with such a numerical table.

If it is determined in step 105 that the running condition of the vehicle is in the lock-up operation region of the torque converter (which is indicated by hatched area in FIG. 4), the routine proceeds to step 110 in which the lock-up clutch of the torque converter 31 is turned ON. Then, in step 115, it is determined whether or not the operation of the supercharger is required.

Figure 5:
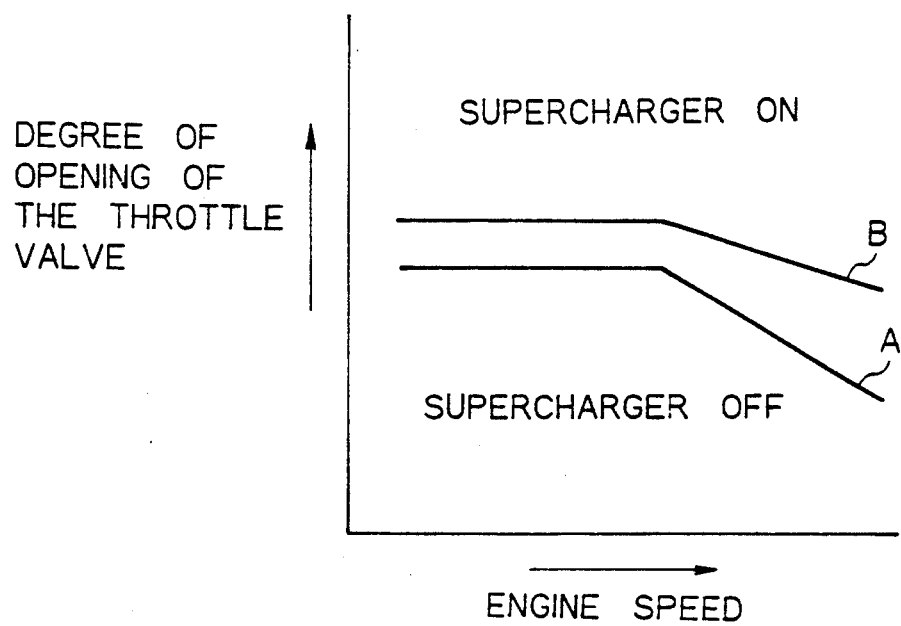
FIG. 5 illustrates the engine load condition in which the supercharger is operated.

The determination of whether or not the operation of the supercharger is required is carried out based on the parameters such as the degree of the opening of the throttle valve TH and the engine speed NE. FIG. 5 shows the conditions for starting or stopping the operation of the supercharger defined by functions of TH and NE. The functions in FIG. 5 are previously stored in the ROM 25 in the form of numerical tables, and whether or not the operation of the supercharger is required is determined in step 115, according to that numerical table.

In this embodiment, two kinds of functions of TH and NE are provided as conditions for starting or stopping the operation of the supercharger as shown in FIG. 5, and either one of the functions is selected in accordance with whether the lock-up clutch is turned ON or OFF. That is, when the lock-up clutch is turned ON, the line A is selected as the criteria for starting or stopping the supercharger. Conversely, the line B is selected when the lock-up clutch is turned OFF. By comparing the lines A and B, it will be understood that the operation of the supercharger is started at a lower engine load when the lock-up clutch is turned ON (line A) than when the lock-up clutch is turned OFF (line B).

In step 115, line A in FIG. 5 is selected as the criteria for the operation of the supercharger, and if it is determined in step 115 that the parameters TH and NE fall in the region requiring the operation of the supercharger, the routine proceeds to step 120 in which the supercharger clutch 6 is turned ON to start the operation of the supercharger 5.

Step 125 shows an operation for setting the degree of the opening of the air bypass valve 9. In this embodiment, the degree of the opening of the air bypass valve is determined in accordance with the degree of the opening of the throttle valve TH and the engine speed NE.

Figure 6A:
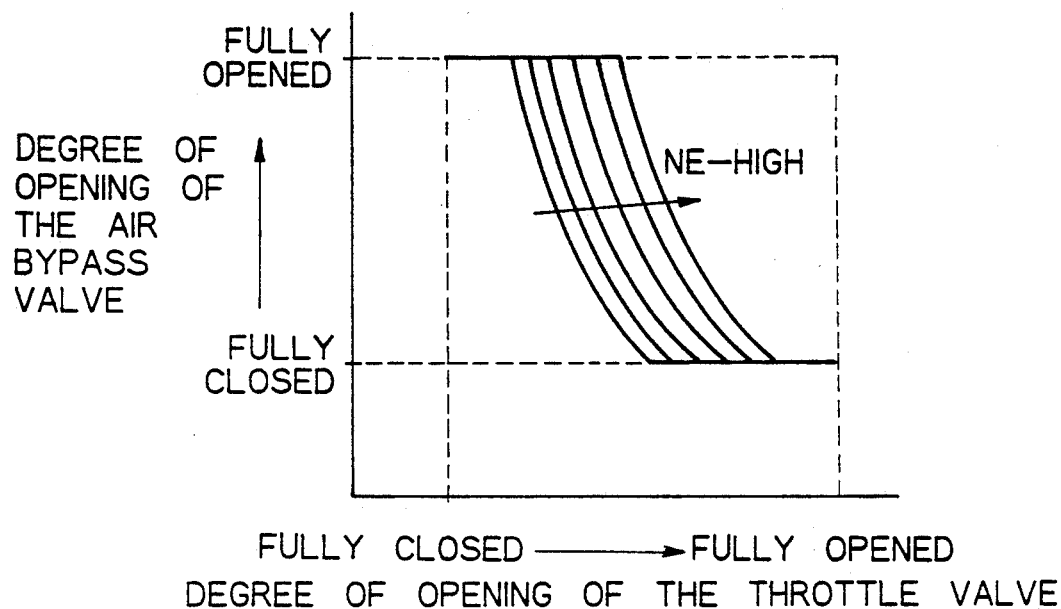
FIG. 6A and FIG. 6B illustrate the relationships between the degree of opening of the air bypass valve and the engine load.
Figure 6B:
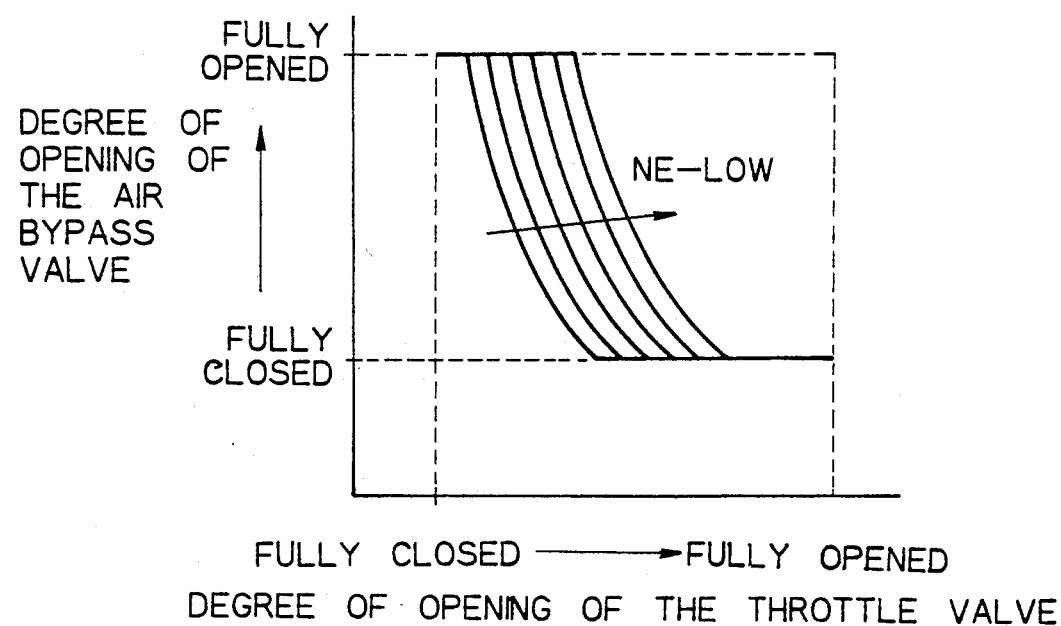

FIGS. 6A and 6B show an example of the setting of the degree of the opening of the air bypass valve 9. In this embodiment, the setting of the degree of the opening of the air bypass valve 9 is given as functions of TH and NE. Different functions having different characteristics are selected in accordance with whether or not the lock-up clutch is turned ON (FIG. 6A) or OFF (FIG. 6B). In both cases, the degree of the opening of the air bypass valve is set larger as the degree of the opening of the throttle valve increases if the engine speed is maintained constant, and is set smaller as the engine speed decreases if the degree of the opening of the throttle valve is maintained constant. However, when the lock-up clutch is turned ON (FIG. 6A), the degree of the opening of the air bypass valve is set generally smaller than when the lock-up clutch is turned ON in a lower engine load region. Accordingly, when the lock-up clutch is turned ON, the boost pressure is increased in a lower engine load region, thereby increasing the engine load during the lock-up operation of the torque converter.

In this embodiment, the functions shown in FIGS. 6A and 6B are previously stored in the ROM 25. In step 125, the degree of the opening of the air bypass valve is determined according to the function shown in FIG. 6A (for the lock-up operation of the torque converter), and at the same time, the degree of the opening of the air bypass valve 9 is adjusted to the determined value using the actuator 8 and the opening angle sensor 19 of the air bypass valve 9.

By this control, the driving torque of the vehicle changes along the line between points A and F in FIG. 2B, thereby increasing driving torque which, in the prior art, is obtained only by a non-lock-up operation of the torque converter, and becomes available in the lock-up operation of the torque converter.

If it is determined that the engine load condition is in a region in which the operation of the supercharger is not required, the routine proceeds to step 130 in which the supercharger clutch 6 is turned OFF to stop the operation of the supercharger 5. Then after setting the degree of the opening of the air bypass valve at a predetermined value (fully opened, for example) in step 135, the routine is terminated.

Further, if it is determined that the running condition of the vehicle is in the non-lock-up operation region of the torque converter, a similar control operation as set forth above is carried out based on the functions for the non-lock-up operation of the torque converter (i.e.,line B in FIG. 5 and FIG. 6B) in steps 140 to 155.

According to the present embodiment, by increasing the boost pressure from a lower engine load region in the lock-up operation of the torque converter, the difference in the driving torque between the lock-up operation and the non-lock-up operation of the torque converter is reduced substantially. Therefore, even if the lock-up clutch of the torque converter is turned ON or OFF under relatively high engine torque conditions, the torque shock caused by the ON/OFF operation of the lock-up clutch is very small and driveability is not impaired.

Although the invention has been described with reference to specific embodiments chosen for the purpose of illustration, it should be understood that numerous modifications could be turned thereto by those skilled in the art without departing from the basic concept and scope of the invention.

We claim:

1. A boost pressure control system for a vehicle engine equipped with a torque converter including a lock-up clutch, said boost pressure control system comprising:
an intake pressure boost means for boosting the intake pressure of the engine; and,
a boost pressure control means for setting the boost pressure of the engine by controlling said intake pressure boost means so that said boost pressure is determined as a function of an engine load and,
said function of the engine load is selected by said boost pressure control means from among a plurality of predetermined functions in accordance with whether said lock-up clutch of the torque converter is connected or disconnected.

2. A boost pressure control system according to claim 1, wherein a different function is selected as said function for determining said boost pressure in accordance with whether said lock-up clutch of the torque converter is connected or disconnected, in such manner that, under low engine load conditions, the boost pressure is set larger when said lock-up clutch is connected than when said lock-up clutch is disconnected.

3. A boost pressure control system according to claim 1, wherein said intake pressure boost means comprising:
a supercharger disposed at an inlet air passage of the engine and driven by said engine via a power transmission clutch, an operation of said supercharger being started or stopped by connecting or disconnecting said power transmission clutch;
an air bypass passage being connected, at one end thereof, to an inlet air passage upstream of the supercharger, and at the other end thereof, to an inlet air passage downstream of the supercharger;
an air bypass valve disposed in said air bypass passage and controlling an air flow through said air bypass passage in accordance with the degree of the opening of the air bypass valve; and wherein said boost pressure control means setting the boost pressure of the engine as a function of the engine load by connecting or disconnecting said power transmission clutch, and by adjusting the degree of the opening of said air bypass valve.

4. A boost pressure control system according to claim 3, wherein a different function is selected as said function for determining said boost pressure, in accordance with whether said lock-up clutch of the torque converter is connected or disconnected in such manner that the operation of said supercharger is started at a lower engine load when said lock-up clutch is connected than when said lock-up clutch is disconnected, and the degree of the opening of said air bypass valve is made smaller under low engine load conditions when said lock-up clutch is connected than when said lock-up clutch is disconnected.

* * * * *